3,425,359
APPARATUS FOR HANDLING TRACK INSTALLATIONS

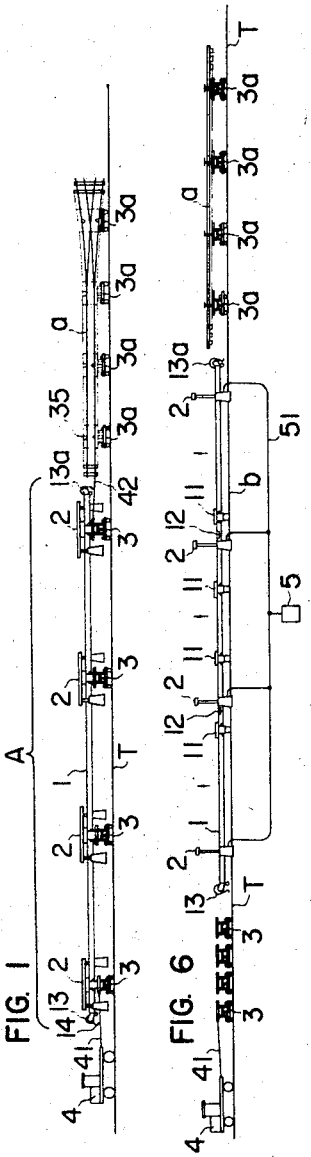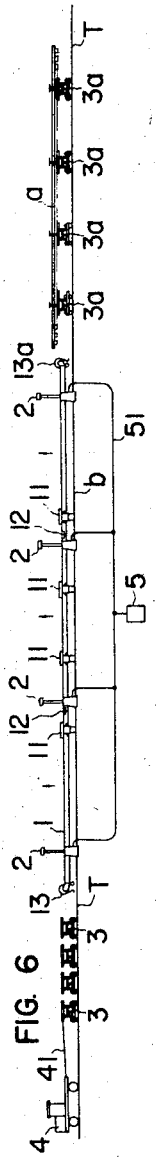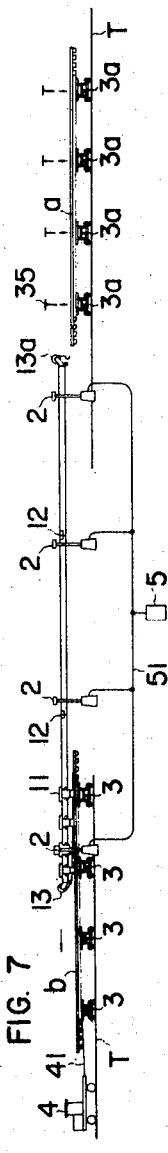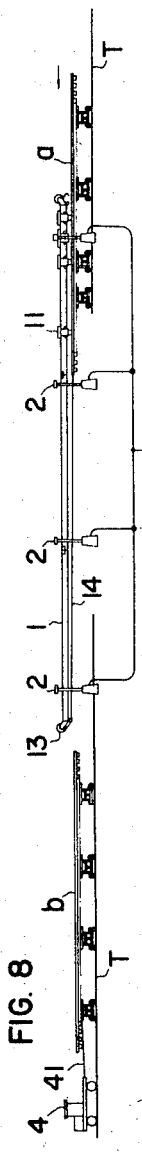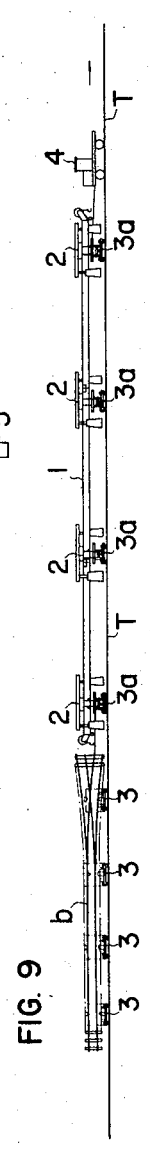

Hiroshi Kawamura, Kozi Mukaihara, Hiroshi Ito and Kiyoshi Akimoto, Tokyo-to, and Yaichiro Atsumi, Toshihiko Taniguchi, Sadayoshi Takahashi and Ichiro Saito, Nagoya-shi, Japan, assignors to Nippon Kokuyu Tetsudo, Tokyo-to, Japan, a juridical person of Japan, and Nippon Sharyo Seizo-Kabushiki Kaisha, Nagoya-shi, Aichi-ken, Japan, a joint-stock company of Japan
Filed Sept. 12, 1967, Ser. No. 667,227
Claims priority, application Japan, Sept. 20, 1966, 41/61,681, 41/61,682
U.S. Cl. 104—2     5 Claims
Int. Cl. E01b 33/00, 29/02

---

ABSTRACT OF THE DISCLOSURE

A track installation such as a turnout (switch and frog) is handled and replaced by a track changing device consisting essentially of a number of portal hoisters straddling the track at the work site, a long main beam hoisted by the portal hoisters, and runners which can move along the main beam and have rail clamps for holding the new or old track installation. The entire apparatus and new or old track installation can be stowed into a compact form for transportation to and from the work site on trucks with tiltable load platforms.

---

This invention relates generally to trackway installations and more particularly to equipment for replacing long track installations such as assembled track sections, turnouts, and relatively small bridges.

More specifically, the invention concerns a new apparatus for replacing track installations which comprises a long, articulated main beam, a plurality of runners with rail clamps for running along the main beam, a plurality of portal hoisters with legs of variable length for hoisting the main beam, and a plurality of trucks for transporting the main beam, runners, and portal hoisters and for transporting old and new track installations.

In replacing a large track installation in assembled state as, for example, a turnout ( of the type known as a switch and frog or point and crossing), the installation is generally assembled at the work site because of its large size. This replacement procedure, however, requires an extremely large amount of labour and time, and, in places of heavy train traffic, the replacement work not only causes a great disruption of the train scheduling but also results in a low degree of precision in spite of the great labour and time expended.

An alternative method for overcoming this difficulty is to assemble accurately a new turnout (for example) in a place separated from work site and to replace the old turnout with the new turnout by means of moving equipment such as a crane or cranes. This method, however, is accompanied by several problems, one of which is the method and means for transporting the moving equipment to the site. More specifically, an ordinary travelling crane cannot be used for work within the constructional limits of railways and, moreover, cannot be transported over long distances on the tracks.

Another problem is the method and means for transporting the turnout (for example) to the site. That is, when the turnout is loaded on ordinary railway trucks or flatcars, the width of the turnout extends outside of the limits of the maximum rolling stock gauge, whereby the turnout cannot be transported over long distances by rail.

It is an object of the present invention to provide an apparatus for replacing track installations which can be readily and conveniently transported over long distances, if necessary, over a trackway and, moreover, can also function as a device for transporting new and old track installations to and from the work site.

Another object of the invention is to provide an apparatus of the above stated character which can be readily and efficiently operated at the work site to replace track installations in a short time with minimum labour.

Other objects of the invention will become apparent as the disclosure proceeds.

According to the present invention, briefly summarized, there is provided an apparatus for replacing track installations in a trackway comprising: a long, articulated main beam supported substantially parallel to the trackway and provided with winches; a plurality of runners adapted to be movable along the main beam and having rail clamps for holding a track installation; a plurality of portal hoisters each having retractable legs of variable length for emplacement on the ground at a work site and having a hoisting device for hoisting and lowering the main beam; and a plurality of trucks on the trackway for carrying other parts of the apparatus and the track installation along the trackway.

A feature of the apparatus according to the invention is that, for transportation to and from a work site, the portal hoisters can be swung diagonally relative to the main beam, and a track installation carried on the trucks can be tilted thereby to place all parts of the apparatus train within the limits of the maximum rolling stock gauge, whereby the entire apparatus can be towed or pushed to and from the work site.

The nature, details, and utility of the invention will be more clearly apparent from the following detailed description with respect to a preferred embodiment of the invention when read in conjunction with the accompanying drawings, in which like parts are designated by like reference numerals and characters.

In the drawings:

FIG. 1 is a diagrammatic side elevational view showing the general organization of an example of an apparatus embodying the invention for transferring trackway installations, the apparatus being shown its state of travel to a work site.

FIGS. 6 through 9, inclusive, are diagrammatic side elevational views indicating the manner in which the apparatus of the invention is operated to replace a turnout (switch and frog).

Figure 2:
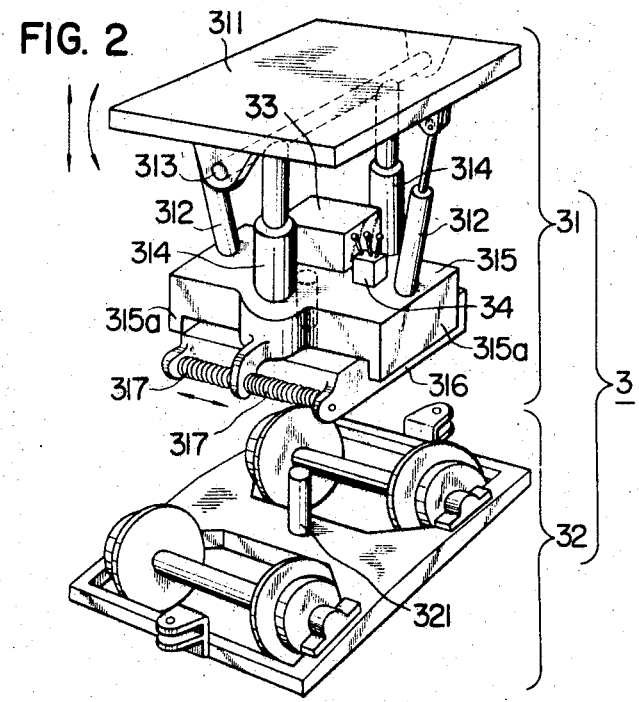
FIG. 2 is an exploded perspective view showing one truck constituting an important component of the apparatus shown in FIG. 1.

FIG. 1 illustrates the state of the apparatus of the invention carrying a new turnout a and travelling to the site where a turnout is to be replaced. The principal part of the apparatus is a track changer A comprising a main beam 1, a plurality of portal hoisters 2, and a plurality of trucks 3 supporting the main beam 1 and hoisters 2. The changer A is coupled at its rear end by a coupling bar 42 to a new turnout a supported on trucks 3a of the same construction as the trucks 3 and is coupled at its front end by a coupling bar 41 to a track motor car 4, by which the train consisting of the changer A and the truck supported turnout a is towed on a track T to the work site.

Figure 3:
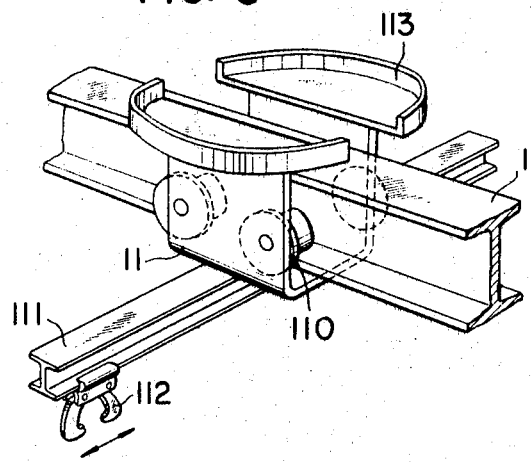
FIG. 3 is a perspective view showing one runner and a fragment of a main beam in cradled position in and through the runner.

The main beam 1 has the cross sectional shape of, for example, an H-beam or an I-beam with wide flanges. The main beam 1 is provided with a suitable number of runners 11 as shown in FIG. 3, each having a channel shape and provided on the inner side thereof with wheels 110 for rolling on the lower flange of the main beam 1, whereby each runner 11 can travel in the longitudinal direction of the main beam 1, which is cradled in and passes through the centre of the interior of each channel-shaped runner 11.

A horizontal cross beam 111 is secured to the lower part of each runner 11 with an orientation perpendicular to the main beam and slidably supports at each end thereof a rail clamp 112 which can move through a certain distance in a horizontal direction perpendicular to the main beam 1.

The two upwardly extending flanges of each channel-shaped runner 11 support at their upper ends respective spaced apart segments of a horizontal turn seat 113 having the shape of a shallow circular tray with a central cutout parallel to the main beam 1 and disposed at a level above the upper flange of the main beam 1.

When the weight of the main beam 1 is to be borne by the trucks 3, the lower surface of the cross beam 111 of one runner 11 is placed on and across the load platform 311 of each truck 3, and the lower surface of the main beam 1 is placed on the upper surface of the bottom web part of the channel-shaped runner 11 to which the cross beam 111 is fixed.

Figure 4:
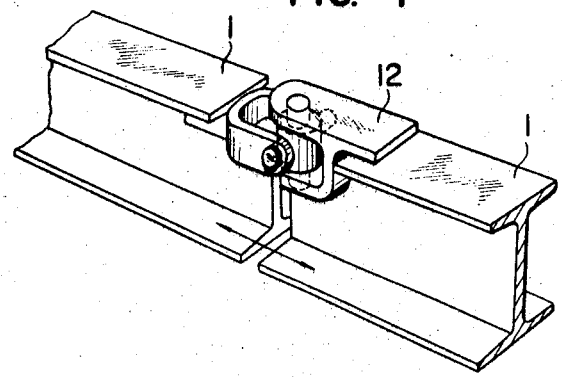
FIG. 4 is a fragmentary perspective view showing the details of an articulated joint in the main beam.

Since the main beam has a total length as long as 50 metres, it must be articulated so that it can freely pass through curves in the trackway and parts thereof with some differences in vertical level. Accordingly, in the example illustrated, the main beam 1 is divided into three sections which are serially joined by universal joints 12 each as illustrated in FIG. 4. Each universal joint 12 permits some rotation about the vertical and horizontal axes of one beam section relative to the other and, moreover, is so constructed as to permit free passage of runners 11 past the joint.

The front and rear ends of the articulated main beam 1 are respectively provided with winches 13 and 13$_a$ mounted thereon as indicated in FIG. 1. A wire rope 14 of ample length to extend over the entire length of the main beam is wound around each winch and is provided at its outer end with a connecting device such as a hook for easy connection to a turnout, a runner 11, or some other article to be moved.

Figure 5:
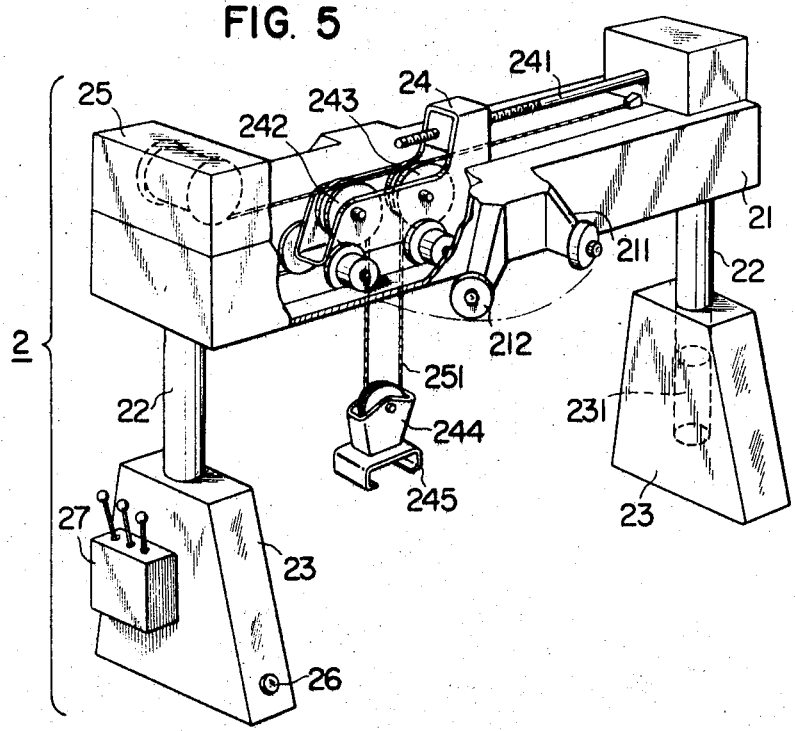
FIG. 5 is a perspective view of one portal hoister constituting another important component of the apparatus shown in FIG. 1.

Each of the aforementioned portal hoisters 2, which are similar in construction to gantry cranes, has a structural frame, as illustrated in FIG. 5, consisting essentially of a horizontal hoist beam 21, vertical legs 22 fixed to the ends of the hoist beam 21, and support bases 23 slidably connected to the lower ends of respective legs 22. Each support base 23 is provided therewithin with a vertical hydraulic cylinder 231 for operating in conjunction with the lower end of the corresponding leg 22 which constitutes the ram or piston of that hydraulic cylinder. Furthermore, the support base 23 can be rotated freely about the leg 22 to assume any desired orientation of its bottom surface in a horizontal plane.

The hoist beam 21 is provided at its middle part and on opposite lateral sides thereof with outrigger turn legs 211 rigidly fixed thereto and provided at their outer ends with wheels 212. These wheels 212 are for rolling engagement with the aforedescribed turn seat 113 on each runner 11, whereby the entire portal hoister 2 can be supported on a runner 11 and freely turned relative thereto about a vertical axis.

On the hoist beam 21, there are provided a hoist winding device 25 mounted on one end of the hoist beam and a crab carriage 24 riding on wheels whereby it can traverse freely along the hoist beam 21 in the longitudinal direction thereof. The carriage 24 is caused to traverse and controllably positioned by means such as, for example, a screw shaft 241 rotated by a hydraulic motor.

The hoist winding device 25 winds and unwinds a wire rope 251 passed over and around sheaves 242 and 243 rotatably supported by the carriage 24 and the sheave of a hoist block 244 which is a running block and anchored at its outer end to a structural part of the hoist beam 21, the sheave of the hoist block 244 being suspended by the wire rope 251 between the sheaves 242 and 243. The drum of the winding device 25 is driven by motive means such as a motor or a hydraulic motor. By the arrangement of the hoist operating parts as shown in FIG. 5, the vertical height position of the hoist block 244 remains unchanged irrespective of the traverse movement of the carriage 24 when the drum of the winding device 25 is stopped.

The lower part of the hoist block 244 is in the form of a gripping device 245 for holding the upper flange of the main beam 1 and can be slid a certain distance along the main beam 1 to a specific position thereon.

A power line receptacle 26, controls 27, and other necessary parts are mounted on one support base 23 of each hoister 2. For example, in the case where electric power is used as a power source, a hydraulic pump within the hoist beam 21 is electrically driven to supply hydraulic pressure for driving various operating mechanisms such as the hoist winding device 25.

The aforementioned truck 3 can be considered to consist of an upper assembly 31 and a bogie assembly 32, as indicated in FIG. 2, on which the upper assembly 31 is turnably mounted. The principal structural parts of the upper assembly 31 are a turn-table 316, a cross slide base 315 slidably mounted on the turn-table 316, telescopic guide columns 314 mounted vertically on the cross slide base 315, and a load platform 311 supported tiltably on the upper ends of the guide columns 314.

The load platform 311 is tiltably mounted on a horizontal shaft 313 orientated substantially parallel to the trackway and fixed to the upper ends of the guide columns 314. The load platform 311 can be raised or lowered through a certain distance and tilted to and held at any angle from 0 to 60 degrees about the shaft 313 by hydraulic cylinder and piston devices 312 each connected at the lower end to the cross slide base 315 and at the upper end to the lower part of the load platform 311 at a point offset from the axis of the shaft 313.

The cross slide base 315 is mounted on the turn-table 316 in a manner permitting cross sliding in the lateral direction, i.e., perpendicularly to the track direction, within a certain distance limited by stops 315$_a$. The cross slide base 315 is normally retained in centerline alignment relative to the turn-table 316 by a centering device comprising return springs 317, 317 when no outside forces are acting on the truck.

The turn-table 316 is pivotally coupled to the bogie assembly 32 by a central bogie pivot 321, which is in the form of a vertical stud pin embedded at its lower end in the frame of the bogie assembly 32, whereby the upper assembly 31 is free to rotate about the axis of the bogie pivot 321 relative to the bogie assembly 32.

Each truck 3 is provided with a hydraulic control device comprising a hydraulic pressure generator 33 driven by an independent miniature engine and control valves 34.

A track installation as, for example, a turnout can be replaced in the following manner through the use of the above described apparatus comprising the main beam 1, runners 11 with rail clamps, portal hoisters 2, trucks 3, trucks 3ₐ, and track motor car 4.

As mentioned hereinbefore, FIG. 1 indicates the state of the track changer A and a new turnout *a* supported on trucks 3ₐ being towed to the work site by the track motor car 4. In this case the support bases 23 of all portal hoisters 2 are in their positions of maximum retraction thereby to leave ample clearance between the bottom ends of the support bases 23 and the ground. Furthermore, all hoist beams 21, rotatably resting on respective turn seats 113, are placed in diagonal angular positions relative to the direction of travel so that the outer ends of the hoist beams 21 and the outermost parts of the support bases 23 are all within the maximum rolling stock gauge. The hoist beams 21 can be thus turned to the diagonal angular positions in a simple manner by hand since the portal hoisters 2 are rotatably supported on the turn seats 113 of the runners 11.

In this case, therefore, the weight of each portal hoister 2 is supported by the respective runner 11, which in turn is supported by the load platform 311 of the respective truck 3. Furthermore, the gripping device 245 of each hoist block 244 is engaged with the main beam 1, and the hoist block 244 is in a hoisted position close to its uppermost position, the main beam 1 resting on the bottom web of each channel-shaped runner 11, whereby the weight of the main beam 1 is supported by each truck 3 by way of the corresponding cross beam 111 of the runner 11.

Since the maximum width of the new turnout *a* supported on the trucks 3ₐ is greater than the width limit of the maximum rolling stock gauge, the load platforms 311 of the trucks 3ₐ are placed at a somewhat high position and, furthermore, are tilted to one side so as to place the new turnout *a* within the limits of the maximum rolling stock gauge thereby to enable it to be transported on the track T. The new turnout *a* is held on the load platforms 311 thus tilted by clamps 35.

As the train consisting of the track changer A and new turnout *a* on trucks 3ₐ is thus towed by the track motor car 4 in the above described state, the main beam 1 flexes at its aforedescribed articulated joints in passing through curves in the track T. While the new turnout *a*, itself, cannot flex, it can pass through curves in the track without undue stress because of cross sliding between the cross slide base 315 and turn-table 316 of each truck 3ₐ as described hereinbefore and indicated in FIG. 2.

When the apparatus arrives at the work site, it is stopped in a position at which the main beam 1 is directly above the old turnout *b* to be replaced. Then the portal hoisters 2 are turned to angular positions perpendicular to the track. This can be accomplished easily by hand.

Next, a portable power supply 5, such as a diesel power unit, which has been transported separately to the site or carried on the track motor car 4, is connected by a power line 51 to the receptacles 26 on the support bases 23 of the hoisters 2 as indicated in FIG. 6. The support bases 23 are then extended relative to the legs 22 to lift the hoist beams 21 to a required height whereby the main beam 1 and the runners 11 are suspended from the hoist beams 21 and are no longer supported by the truck 3.

Then the trucks, which have transported the track changer A and are now free of load, are moved forward and gathered at a place forward of the front end of the main beam 1. The runners 11, which are now free and are supported on their wheels 110 for rolling on the main beam 1, are then moved to suitable positions above the old turnout *b*, and the main beam 1 is lowered by unwinding the hoist winding devices 25 of the portal hoisters 2.

Next, the rail clamps 112 supported on the cross beams 111 of the runners 11 are clamped onto the old turnout *b*. Then, after the old turnout *b* has been disconnected from the main trackway T, the main beam 1 is hoisted by winding the hoist winding devices 25 thereby to hoist the old turnout *b*.

In this procedure, it is not always possible to position the main beam 1 at the midpoint of the portal hoister 2 because of reasons such as the eccentric centre of gravity or the configuration of the old turnout *b*. In such cases, the hoist carriage 24 of each hoister 2 is suitably shifted in the lateral direction along the hoist beam 21 by means of the screw shaft 241.

Next, as indicated in FIG. 7, the old turnout *b* thus hoisted is drawn forward by means of the winch 13 mounted on the front end of the main beam 1, the outer end of the wire rope 14 being connected to the rear end of the old turnout *b*, whereupon the old turnout *b* suspended from the runners 11 is moved forward along the main beam 1 in a manner similar to that of a curtain being moved along a curtain rail.

Then, beginning with the most forward truck 3, the load platforms 311 of the trucks 3 are successively raised a short distance to receive and support the old turnout *b* at suitably spaced apart points thereof. At the same time, the rail clamps 112 of the runners 11 which thereby become successively unnecessary are disconnected from the old turnout *b* is finally resting completely on all trucks 3 (four trucks 3 in the illustrated example) and is then secured to the load platforms by means of the clamps 35.

During the above described procedure, as the old turnout *b* moves forward, there arises the necessity of suitably moving the hoist carriages 24 in the lateral direction in the portal hoisters 2, and this moving of the carriages 24 can be readily accomplished by hydraulic control as described hereinbefore.

On one hand, the load platforms 311 of the trucks 3ₐ supporting the new turnout *a* are turned to the horizontal position, and the clamps 35 which have been holding the new turnout *a* are unclamped in preparation for the following step of drawing the new turnout *a* forward in a suspended state.

FIG. 8 indicates an intermediate stage in this step of drawing forward the new turnout *a*. First, all runners 11 are gathered at the rear end of the main beam 1. Then the new turnout *a*, resting on the load platforms 311 of the trucks 3ₐ in a somewhat high position, is drawn forward below the main beam 1 by means of the winch 13. Then, as the load platforms 311, beginning with that of the foremost truck 3, are successively lowered, the rail clamps 112 of the runners 11 are correspondingly clamped onto the new turnout *a* at suitably spaced apart positions thereof. The new turnout *a* is thus moved forward in suspended state to a position directly above the former position of the old turnout *b*.

Next, the hoist winding devices 25 are operated to lower the main beam 1 and thereby to lower the new turnout *a* into place. The new turnout *a* is then connected to the main trackway T, and the rail clamps 112 are all disconnected from the new turnout *a*, whereupon the work of laying the new turnout *a* is completed.

When the new turnout *a* has been thus laid, the hoist winding devices 25 are operated to raise the main beam 1, and the trucks 3ₐ are moved forward to positions immediately below respective hoist beams 21. The runners 11 are brought to positions immediately below the middle parts of respective portal hoisters 2. The main beam 1 is fully hoisted, and the support bases 23 on the legs 22 of all hoisters 2 are fully retracted.

Thereupon, the weight of each portal hoister 2 is supported by the corresponding truck 3ₐ through the corresponding runner 11. Then, when the position of the suspended main beam 1 is lowered slightly, the weight of the main beam 1 is also supported by the trucks 3ₐ through the runners 11.

The power lines 51 are then disconnected, and all hoist beams 21 are turned to diagonal positions to place the ends of the hoist beams 21 and the outermost parts of the support bases 23 within the maximum rolling stock gauge. On one hand, the old turnout b, clamped by clamps 35 to the load platforms 311 of the trucks 3, is tilted to a suitable angle to bring its laterally outermost parts within the maximum rolling stock gauge. The track motor car 4, the old turnout b on the trucks 3, and the track changer are then coupled by coupling bars 41 and 42, whereupon the entire apparatus is prepared for withdrawal, either by towing with the track motor car 4 as indicated in FIG. 9 or by pushing with the same.

By the use of the apparatus of the present invention as described above in accordance with the above described procedure, replacement of trackway equipment can be accomplished in a logical and simple manner in a short time, extremely high effectiveness and suitability being exhibited by the apparatus and procedure of the invention particularly in the interchanging of old and new turnouts.

The principal advantageous features of the apparatus of the invention are as follows.

(1) The length of each combination of the leg 22 and support base 23 of each portal hoister 2 can be varied freely. Therefore, the installation position of each hoister 2 can be selected at will even at sites where the ground is uneven and even over tracks having a cant.

(2) The point of engagement of the hoisting equipment of each portal hoister 2 and the main beam 1 can be shifted somewhat in the longitudinal direction of the main beam. Therefore, the portal hoisters 2 can be installed at places which are clear of obstructions such as poles for overhead lines and railway signals.

(3) The hoisting equipment can cause the main beam 1 to move freely in directions perpendicular to the track. Therefore, it is possible to suspend a turnout accurately at its centre of gravity, and track replacement work can be carried out safely and without any difficulty even at curves in the trackway.

(4) The hoisting force is applied through wire rope. Therefore, the hoisting action is elastic, and errors in laying position to some extent of a turnout can be readily corrected by human power with the turnout in the hoisted state. Furthermore, the wire rope does not impart an inconvenient horizontal force to the portal hoister.

(5) The track replacement apparatus and work on one track of a double-track railway do not affect the other track.

(6) The apparatus of the invention is not limited to its use in replacing turnouts but can similarly handle other track installations such as ordinary track-and-tie frames and relatively small bridges.

(7) The truck 3 (or 3$_a$) according to the invention has an organization in which a bogie assembly 32 rotatably supports a turn-table 316 supporting in turn a cross slide base 315 which can slide laterally relative to the turn-table 316 and is centered relative to the turn-table 316 by return springs 317, 317 interposed therebetween. Therefore, the apparatus can pass freely along the track even when carrying a track installation of considerable length.

(8) Each of the trucks 3 (and 3$_a$) has a load platform 311 which can be freely raised, lowered, and tilted by means such as hydraulic cylinder-and-piston devices. Therefore, it is possible to place all parts of the apparatus and carried objects within the limits of the maximum rolling stock gauge thereby to prevent obstruction to free travel along a trackway, whereby the transportation of track installations of wide width such as a turnout is made possible.

(9) The trucks 3 (and 3$_a$) of the invention make possible smooth transfer of new and old track installations to and from the track changer A at the time of track replacement. Therefore, the truck 3 (or 3$_a$) according to the invention is highly suitable and effective in practice as a truck for transportation of track installations.

What we claim is:

1. Apparatus for replacing track installations in a trackway comprising, in combination: a long, articulated main beam supported substantially parallel to the trackway and provided at its ends with winches; a plurality of runners provided with wheels for running along the main beam and each having rail clamps for holding a track installation; a plurality of portal hoisters each having retractable legs of variable length for emplacement on the ground at a work site and hoisting means for hoisting and lowering the main beam; and a plurality of trucks each riding on the trackway and having a tiltable load platform of adjustable height, a number of the trucks being used for carrying the main beam, runners, and portal hoisters and the remainder of the trucks being used for carrying a track installation coupled to the main beam during transportation to and from the work site, each portal hoister, with retracted legs, being swingable diagonally relative to the main beam and the load platforms of the trucks carrying the track installation being tilted to place all parts of the apparatus within the limits of the maximum rolling stock gauge and thereby to enable the apparatus to be moved, in toto, along the trackway.

2. The apparatus as claimed in claim 1 in which each portal hoister comprises: a portal structure consisting essentially of a horizontal hoist beam, the retractable legs fixed to respective ends of the hoist beam, and radially projecting turn legs fixed to the middle part of the hoist beam and having wheels at their extremities for turn-table engagement with a horizontal turn seat disposed at the upper part of a runner, whereby the hoist beam can be swung diagonally relative to the main beam; a hoist carriage provided with wheels for moving along the hoist beam in the longitudinal direction thereof; a driving device for thus moving the hoist carriage and stopping the same at any desired position; and a hoisting mechanism comprising a hoist winding device mounted on the hoist beam, sheaves rotatably supported on the hoist carriage, a hoist block fixed to a gripping device for gripping the main beam, and a wire rope passed around said sheaves and the hoist block and wound by the hoist winding device to raise the hoist block.

3. The apparatus as claimed in claim 1 in which each of the trucks comprises: a bogie assembly with wheels for travelling on the trackway; a turntable pivotally mounted on the bogie assembly; a cross slide base mounted on the turntable in a manner permitting cross sliding thereof through a limited distance relative to the turn-table; centering means including return springs for normally centering the cross slide base relative to the turn-table; a load platform provided with clamps for holding loaded objects thereonto; and adjustable support means mounted on the cross slide base and supporting the load platform in a manner whereby the load platform can be adjustably tilted, raised, and lowered.

4. The apparatus as claimed in claim 2 in which each retractable leg of the portal hoister comprises: a leg strut fixed at its upper end to one end of the hoist beam and formed as a hydraulic ram at its lower end; a support base having a wide base line at its lower end for contact with the ground; and a hydraulic cylinder fixed centrally in the support base and coaxially accommodating the hydraulic ram to operate hydraulically therewith thereby to vary the total length of the retractable leg, the hydraulic cylinder being rotatable relative to the hydraulic ram about the common axis thereof.

5. The apparatus as claimed in claim 3 in which the adjustable support means of each truck comprises: two vertical guide columns spaced apart on a line parallel to the direction of travel of the truck and consisting of respective telescopic combinations of hydraulic cylinders and rams rigidly fixed at their lower ends to the cross slide base and at their upper ends to a horizontal member on which the load platform is tiltably pivoted; at least two variable length struts each consisting of a hydraulic cylinder connected at its lower end to the cross slide base, a hydraulic piston within the hydraulic cylinder, and a piston rod fixed at its lower end to the hydraulic piston and connected at its upper end to the lower side of the load platform at a point offset from the axis of said horizontal member; and a controllable hydraulic pressure system mounted on the cross slide base for controllably supplying hydraulic pressure to the guide columns and variable length struts for adjustment of the height and tilt of the load platform.

References Cited

UNITED STATES PATENTS

| 397,577 | 2/1889 | Anderson. |
|---|---|---|
| 3,283,926 | 11/1966 | Eckhardt et al. |
| 3,330,219 | 7/1967 | Plasser et al. |

ARTHUR L. LA POINT, *Primary Examiner.*

RICHARD A. BERTSCH, *Assistant Examiner.*